United States Patent [19]

Takaoka et al.

[11] Patent Number: 5,478,416
[45] Date of Patent: Dec. 26, 1995

[54] MAGNETIC ALLOY

[75] Inventors: Satoshi Takaoka, Saitama; Masaaki Matsushima, Kanagawa; Makoto Kameyama, Chiba; Yoshio Kawakami; Michio Yanagi, both of Saitama, all of Japan

[73] Assignee: Canon Kabushiki Kaisha, Tokyo, Japan

[21] Appl. No.: 184,287

[22] Filed: Jan. 21, 1994

[51] Int. Cl.$^6$ .............. C22C 38/16; H01F 1/147
[52] U.S. Cl. .............. 148/306; 420/26; 420/28; 420/82
[58] Field of Search .............. 148/306; 420/10, 420/26, 28, 82

[56] References Cited

U.S. PATENT DOCUMENTS 5,178,689  1/1993  Okamura et al. .............. 148/306

FOREIGN PATENT DOCUMENTS 62-158306  7/1987  Japan.
3-270203  12/1991  Japan .............. 420/10
4-139805  5/1992  Japan .............. 148/306

Primary Examiner—George Wyszomierski
Attorney, Agent, or Firm—Robin, Blecker, Daley & Driscoll

[57] ABSTRACT

A magnetic alloy which contains Fe; 1–15 at. %, at least one element selected from the group consisting of Ti, Zr, Hf, V, Nb, Ta, Mo and W; 1–10 at. %, at least one element selected from among platinum group elements; 0.1–5 at. %, at least one element selected from the group consisting of Cu, Ag, Au and Cd; 1–20 at. %, at least two elements selected from the group consisting of C, O, B and N; and 3–10 at. %, Al.

5 Claims, 5 Drawing Sheets

○ ··· Fe - 6.5Hf - 5.5Pt - 0.1Cu - 3.0Al - C
△ ··· Fe - 10.0Hf - 5.0Pt - 0.1Cu - 3.0Al - C
⌀ ··· Fe - 6.5Hf - 5.5Pt - 0.1Cu - 3.0Al - C - O

MAGNETIC ALLOY

BACKGROUND OF THE INVENTION

1. Field of the Invention

The present invention relates to a magnetic alloy which has low coercive force, high permeability and high saturation magnetic flux density as well as excellent corrosion resistance and heat resistance and is, therefore, suitable for use as a material for a magnetic head for high density magnetic recording.

2. Description of the Related Art

In recent years, the development of magnetic recording techniques has been remarkable, and recording density has become higher and higher. To increase recording density, it is necessary to provide a magnetic recording medium of higher coercive force. To magnetize a magnetic recording medium of high coercive force, it is necessary to use a magnetic head made of a material having a high saturation magnetic flux density.

As is known, an alloy material, such as "Permalloy", "Sendust" or a Co based amorphous alloy, is conventionally employed as a core material for such a magnetic head. In contrast, the coercive force of magnetic recording media has been increasing more and more, and some magnetic recording media have realized coercive forces not less than 2,000 oersteds (Oe). If the coercive force becomes 2,000 Oe or more, it has been difficult to realize good magnetic recording and reproduction by using a magnetic head using such a. conventional alloy material. This is because the saturation magnetic flux density Bs of any of the alloy materials is not greater than 13,000 gausses (=1.3 T).

From the above-described background, a magnetic alloy having a crystallitic structure and a composition represented as Fe-M-C or Fe-M-N (M is Ti, Zr, Hf, V, Nb, Ta, Mo, W or the like) has recently been proposed as a material having a saturation magnetic flux density higher than any of "Permalloy", "Sendust" and the Co based amorphous alloy.

However, to implement good characteristics with the magnetic alloy such as Fe-M-C or Fe-M-N, heat treatment of 450° C. or more is needed, so that it has been impossible to use the magnetic alloy as a material for, in particular, a magnetic head which is formed by a comparatively low temperature process, such as a thin-film magnetic head. Also, during the production of 8 mm VTR heads, heat resistance to a minimum of 550° C. is required to effect glass bonding. However, conventionally, it has not been proposed to provide a material capable of realizing stable magnetic characteristics over such a wide range of heat treatment temperatures.

Also, if a magnetic head made of the aforesaid core material consisting essentially of Fe is employed under high temperature and high humidity conditions, discoloration or rust occurs on the surface of the magnetic head, so that the slide surface of the magnetic head for contact with a magnetic recording medium becomes rough. As a result, spacing loss occurs, and it is impossible to attain satisfactory electromagnetic conversion characteristics.

The relative speeds between magnetic recording media and magnetic heads have been increasing more and more, and there is the possibility that a relative speed in excess of 10 m/sec may appear. If a magnetic recording medium is made to run for a long time at such a high relative speed, the magnetic thin film portion of the core material is abraded. In particular, in the case of an MIG (metal-in-gap) head of the type in, which magnetic thin films are formed on the gap forming faces of a ferrite core, a step difference between the magnetic thin film portion and the ferrite portion occurs due to abrasion, whereby spacing loss is caused. Accordingly, it has been impossible to satisfactorily utilize the electromagnetic characteristics of the MIG head.

SUMMARY OF THE INVENTION

The present invention has been made in the light of the above-described problems, and an object of the present invention is to provide a magnetic thin film having high saturation magnetic flux density and low coercive force as well as magnetic characteristics which are not degraded under various environmental conditions.

To achieve the above-described object, according to one aspect of the present invention, there is provided an alloy which contains Fe, at least one kind of element selected from the group consisting of Ti, Zr, Hf, V, Nb, Ta, Mo and W, at least one kind of element selected from among platinum group elements, at least one kind of element selected from the group consisting of Cu, Ag, Au and Cd, at least one kind of element selected from the group consisting of C, O, B and N, and Al. In this magnetic thin film, at least one kind of element selected from the group consisting of Ti, Zr, Hf, V, Nb, Ta, Mo and W is added by 1–15 at. %, at least one kind of element selected from among platinum group elements is added by 1–10 at. %, at least one kind of element selected from the group consisting of Cu, Ag, Au and Cd is added by 0.1–5 at. %, at least one kind of element selected from the group consisting of C, O, B and N is added by 1–20 at. %, and Al is added by 3–10 at. %.

According to another aspect of the present invention, there is provided a magnetic material which contains Fe as an essential element and, as additive elements, 5–10 atomic %, Pt; 2–15 atomic %, at least one kind of transition element selected from the group consisting of Ti, Zr, Hf, V, Nb, Ta, Mo and W; and 0.5–15 atomic %, at least one kind of nonmetal selected from the group consisting of C, O, B and N.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below with reference to the accompanying drawings.

FIRST EMBODIMENT

In the description of the first embodiment, the character "M" denotes at least one kind of element selected from the group consisting of Ti, Zr, Hf, V, Nb, Ta, Mo and W, the character "X" denotes at least one kind of element selected from among platinum group elements, the character "L" denotes at least one kind of element selected from the group consisting of Cu, Ag, Au and Cd, and the character "Z" denotes at least one kind of element selected from the group consisting of C, O, B and N.

As experimental examples 1, 2, 3 and 4, a magnetic thin film made of a magnetic alloy represented as Fe-M-X-L-Al-Z was formed and the adequate contents of L (for example, Cu) and Al, Z (for example, C), M (for example, Hf), X (for example, Pt) were examined, respectively. The respective experimental examples 1, 2, 3 and 4 will be described below.

Experimental Example 1

First, to examine the adequate contents of L (for example, Cu) and Al, a thin film made of an alloy in which Cu and Al were added to a magnetic alloy having a composition represented as Fe-6.5Hf-5.5Pt-7.0C (at. %) was formed and examination was performed of the effect of the addition of Cu and Al which influence the heat-treatment temperature dependence of the coercive force of the thin film.

Figure 1:
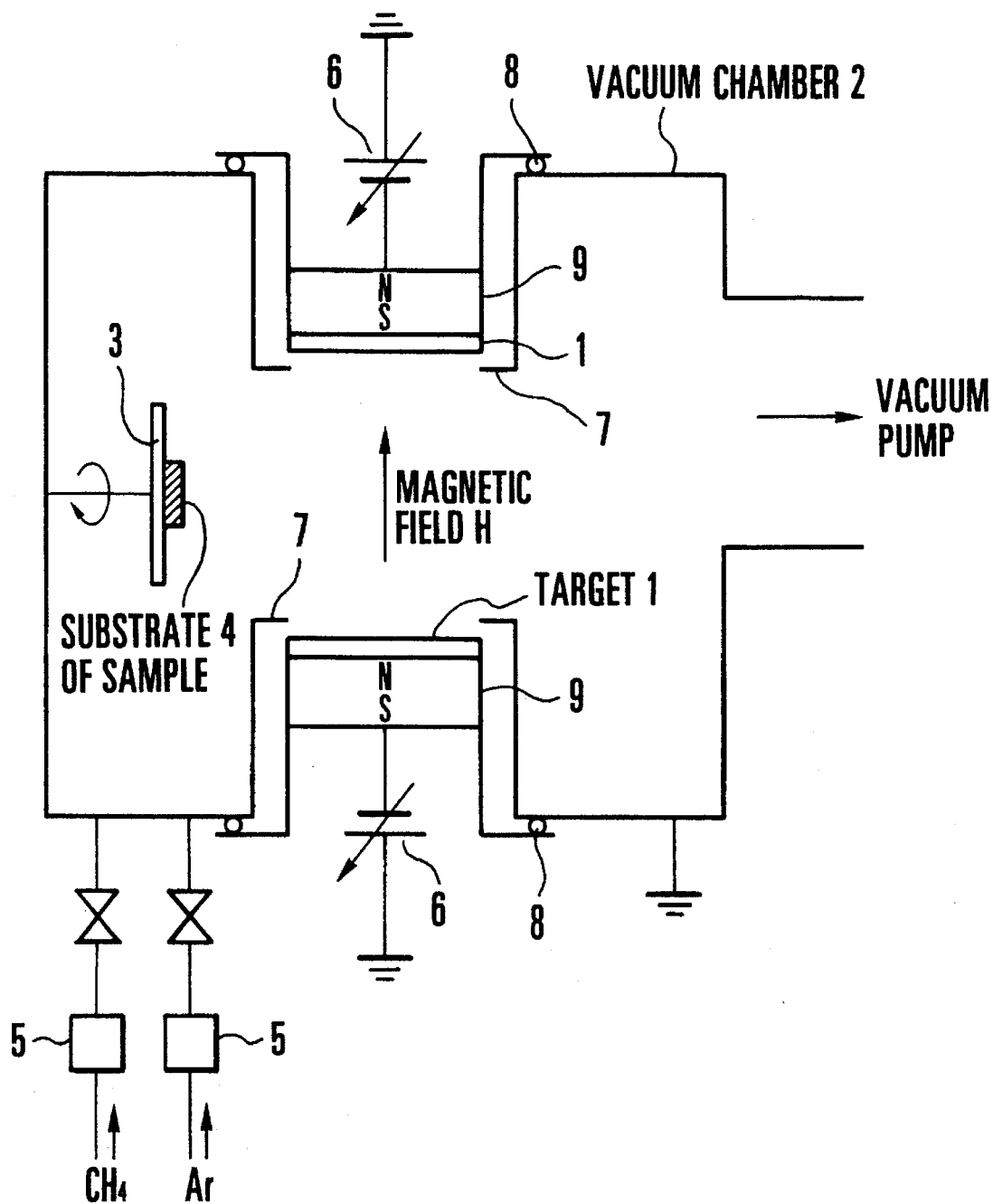
FIG. 1 is a schematic, explanatory view showing the arrangement of a sputtering apparatus for forming a magnetic thin film according to each preferred embodiment of the present invention.

FIG. 1 shows a sputtering apparatus for forming a magnetic thin film according to the first embodiment as well as another embodiment which will be described later. This apparatus is arranged to form a magnetic thin film by using an opposed-target system. In the case of sputtering using a conventional magnetron system, the use efficiency of a target with respect to the amount of consumption of the target has been low so that it has been difficult in terms of cost to employ a larger amount of noble metal as the material of a target. In contrast, since the first embodiment employs the opposed-target system, the use efficiency is high and a substantial amount of noble metal can be employed without any problem.

For formation of magnetic thin film samples, the opposed-target sputtering apparatus shown in FIG. 1 was employed. Targets made of an Fe-Hf-Pt alloy were used as a pair of targets 1 which were disposed in such a manner as to be opposed to each other within a vacuum chamber 2 of this apparatus. Addition of Cu and Al was performed with Cu and Al chips being respectively fitted into the recesses formed in each of the targets 1. As a matter of course, in each of the other experimental examples, by forming a metal to be added into a metal chip in this manner, it is similarly possible to perform the experiment of changing the metal contents. Sputtering gases to be introduced into the vacuum chamber 2 via mass flow rate meters 5 were Ar and $CH_4$, and each of the gas pressures was 7 mTorr. The film thickness of each film to be formed was 5 µm.

The operation of this apparatus will be described in brief. Negative potentials are respectively applied to the targets 1 by DC power sources 6, and the Ar and $CH_4$ gases introduced into the vacuum in the vacuum chamber 2 are ionized. The ions are accelerated by the negative electric field and strike against the targets 1, thereby sputtering the targets 1. During this process, the plasmas of the Ar and $CH_4$ gas ions are focused by a magnetic field H which is generated by magnets 9 (for example, rare earth magnets) disposed at the reverse sides of the respective targets 1. Thus, a magnetic thin film can be highly efficiently and rapidly formed on a sample substrate 4 held on a rotating substrate holder 3. In FIG. 1, each target shield is indicated by reference numeral 7, and each insulating and vacuum sealing portion is indicated by reference numeral 8.

A plurality of magnetic thin film samples were formed in the above-described manner by using the apparatus. The individual samples were subjected to heat treatment at different temperatures, and coercive forces Hc developed at the respective heat treatment temperatures were examined. Table 1 shows the result of the examination. The heat treatment was performed by using a vacuum heat treatment oven.

TABLE 1

| Sample No. | Composition of alloy film [at %] | Hc [Oe] at each heat treatment temperature [°C.] | | | | | | | | Bs [T] |
|---|---|---|---|---|---|---|---|---|---|---|
| | | 300 | 400 | 450 | 500 | 550 | 600 | 650 | 700 | |
| 1 | Fe—6.5Hf—5.5Pt—7.0C | 10.1 | 2.6 | 1.0 | 0.5 | 0.6 | 1.6 | 2.7 | 6.0 | 1.7 |
| 2 | Fe—6.5Hf—5.5Pt—7.0C—0.05Cu | 9.8 | 2.7 | 1.0 | 0.5 | 0.6 | 1.6 | 2.7 | 6.0 | 1.7 |
| 3 | Fe—6.5Hf—5.5Pt—7.0C—0.1Cu | 6.5 | 1.8 | 0.6 | 0.5 | 0.5 | 1.7 | 2.7 | 6.5 | 1.65 |
| 4 | Fe—6.5Hf—5.5Pt—7.0C—5.0Cu | 6.4 | 1.9 | 0.6 | 0.5 | 0.5 | 1.7 | 2.7 | 7.0 | 1.45 |
| 5 | Fe—6.5Hf—5.5Pt—7.0C—5.5Cu | 10.0 | 2.7 | 1.0 | 0.5 | 0.5 | 1.7 | 2.8 | 7.0 | 1.3 |
| 6 | Fe—6.5Hf—5.5Pt—7.0C—0.1Cu—1.0Al | 6.5 | 1.8 | 0.6 | 0.5 | 0.5 | 1.7 | 2.7 | 6.5 | 1.6 |
| 7 | Fe—6.5Hf—5.5Pt—7.0C—0.1Cu—3.0Al | 4.4 | 1.5 | 0.5 | 0.5 | 0.5 | 0.8 | 1.0 | 2.0 | 1.5 |
| 8 | Fe—6.5Hf—5.5Pt—7.0C—0.1Cu—10.0Al | 4.6 | 1.6 | 0.6 | 0.6 | 0.6 | 1.0 | 1.2 | 2.1 | 1.4 |
| 9 | Fe—6.5Hf—5.5Pt—7.0C—0.1Cu—11.0Al | 7.0 | 1.9 | 1.0 | 0.8 | 0.9 | 2.0 | 2.7 | 6.0 | 1.2 |
| 10 | Fe—10.0Hf—5.0Pt—3.0C | 10.2 | 2.7 | 1.0 | 0.6 | 0.5 | 1.7 | 2.9 | 6.5 | 1.8 |
| 11 | Fe—10.0Hf—5.0Pt—3.0C—0.05Cu | 10.0 | 2.8 | 1.0 | 0.6 | 0.5 | 1.7 | 2.9 | 6.4 | 1.8 |
| 12 | Fe—10.0Hf—5.0Pt—3.0C—0.1Cu | 6.7 | 1.9 | 0.7 | 0.6 | 0.6 | 1.7 | 2.9 | 6.5 | 1.7 |
| 13 | Fe—10.0Hf—5.0Pt—3.0C—5.0Cu | 6.6 | 2.0 | 0.7 | 0.6 | 0.6 | 1.7 | 3.0 | 6.8 | 1.5 |
| 14 | Fe—10.0Hf—5.0Pt—3.0C—5.5Cu | 11.0 | 2.9 | 1.1 | 0.6 | 0.6 | 1.8 | 2.9 | 7.1 | 1.35 |
| 15 | Fe—10.0Hf—5.0Pt—3.0C—0.1Cu—1.0Al | 6.6 | 1.9 | 0.7 | 0.6 | 0.6 | 1.8 | 2.8 | 6.6 | 1.6 |
| 16 | Fe—10.0Hf—5.0Pt—3.0C—0.1Cu—3.0Al | 4.5 | 1.4 | 0.6 | 0.5 | 0.5 | 0.8 | 1.1 | 2.2 | 1.5 |
| 17 | Fe—10.0Hf—5.0Pt—3.0C—0.1Cu—10.0Al | 4.6 | 1.7 | 0.6 | 0.6 | 0.6 | 1.0 | 1.2 | 2.2 | 1.4 |

TABLE 1-continued

| Sample No. | Composition of alloy film [at %] | Hc [Oe] at each heat treatment temperature [°C.] | | | | | | | | Bs [T] |
|---|---|---|---|---|---|---|---|---|---|---|
| | | 300 | 400 | 450 | 500 | 550 | 600 | 650 | 700 | |
| 18 | Fe—10.0Hf—5.0Pt—3.0C—0.1Cu—11.0Al | 7.2 | 2.0 | 1.1 | 0.9 | 1.0 | 2.2 | 2.8 | 6.1 | 1.2 |

As can be seen from Table 1, if the Fe-6.5Hf-5.5Pt7.0C (at. %) alloy thin film indicated by sample No. 1 is not subjected to heat treatment of 450° C. or more, the coercive force Hc does not become 1 Oe or less, Even if Cu is added to the Fe-6.5Hf-5.5Pt-7.0C (at. %) alloy thin film, the addition of 0.05 at. % Cu shown in sample No. 2 has no effect. In contrast, as shown in sample Nos. 3 and 4, if Cu is added by 0.1–5.0 at. %, the heat treatment temperature necessary for lowering the coercive force Hc becomes lower. However, as shown in sample No. 5, if Cu is added by 5.5 at. %, the coercive force Hc does not become 1 Oe or less so far as no heat treatment of 450° C. or more is again performed. From these facts, it is preferable that the Cu content be selected to be 0.1–5.0 at. %.

However, as the heat treatment temperature is made to rise, the temperature at which the coercive force Hc starts to rise falls because of the addition of Cu, with the result that the heat resistance is degraded. For this reason, as an alloy for magnetic heads, it is desirable to employ an alloy which can lower the coercive force Hc in a wider range of heat treatment temperatures.

For this reason, samples were prepared by adding different amounts of Al to the Fe-6.5Hf-5.5Pt-7.0C-0.1Cu (at. %) alloy. Sample Nos. 6–9 show the coercive forces Hc developed in the respective alloy film samples at individual heat treatment temperatures. As can be seen from sample Nos. 6–9, the addition of 1.0 at. % Al (sample No. 6) has no effect, but if Al is added by 3.0–10.0 at. % as shown in sample Nos. 7 and 8, the temperature at which the coercive force Hc starts to rise becomes higher, and in addition, the heat treatment temperature necessary for lowering the coercive force Hc becomes lower. However, if Al is added by 11.0 at. % (sample No. 9), the heat treatment temperature necessary for lowering the coercive force Hc becomes higher and, in addition, the temperature at which the coercive force Hc starts to rise becomes lower. From these facts, it is preferable to add Al by 3.0–10.0 at. %. Incidentally, if such an effect is not needed, the addition of Al is not needed. This kind of composition will be referred to in the description of a second embodiment.

The column at the right end of Table 1 shows the saturation magnetic flux density Bs obtained by adding Cu and Al to the Fe-6.5Hf-5.5Pt-7.0C (at. %) alloy. As shown in this column, the saturation magnetic flux density Bs of each alloy containing neither Cu nor Al is 1.7 T. If Cu in excess of 5 at. % is added, the saturation magnetic flux density Bs becomes less than 1.4 T. Therefore, it is preferable that the Cu content be selected to be 0.1–5.0 at. %. Also, if Al in excess of 10.0 at. % is added, the saturation magnetic flux density Bs becomes less than 1.4 T. Therefore, it is preferable that the Al content be selected to be 3.0–10.0 at. %.

Sample Nos. 10–18 show the coercive forces Hc developed in other alloy films at the individual heat treatment temperatures, and these alloy films were prepared by adding different amounts of Cu and Al to an Fe-Hf-Pt-C mother alloy of composition different from the above-described one. As Can be seen from sample Nos. 10–18, similarly to the above-described case of the Fe-6.5Hf-5.5Pt-7.0C (at. %) alloy, the addition of Cu and Al to the Fe-10.0Hf-5.0Pt-3.0C (at. %) alloy shown as sample No. 10 is effective in lowering the heat treatment temperature necessary for lowering the coercive force Hc as well as in raising the temperature at which the coercive force Hc starts to rise. Further, it can be seen that the optimum contents of Cu and Al are 0.05–5.0 at. % and 3.0–10.0 at. %, respectively, and that the optimum contents of Cu and Al do not vary even if the composition of the mother alloy is varied.

A plurality of different magnetic thin film samples were prepared by adding, instead of Cu, any one of Ag, Au and Cd to an Fe-6.5Hf-5.5Pt-7.0C at. % alloy (sample No. 1). Table 2 shows the coercive forces Hc developed in each of the magnetic thin film samples at the respective heat treatment temperatures.

TABLE 2

| Sample No. | Composition of alloy film [at %] | Hc [Oe] at each heat treatment temperature [°C.] | | | | | | | | Bs [T] |
|---|---|---|---|---|---|---|---|---|---|---|
| | | 300 | 400 | 450 | 500 | 550 | 600 | 650 | 700 | |
| 1 | Fe—6.5Hf—5.5Pt—7.0C | 10.1 | 2.6 | 1.0 | 0.5 | 0.6 | 1.6 | 2.7 | 6.0 | 1.7 |
| 19 | Fe—6.5Hf—5.5Pt—7.0C—0.05Ag | 9.9 | 2.7 | 1.0 | 0.5 | 0.6 | 1.6 | 2.7 | 6.2 | 1.7 |
| 20 | Fe—6.5Hf—5.5Pt—7.0C—0.1Ag | 6.6 | 1.9 | 0.5 | 0.5 | 0.6 | 1.7 | 2.7 | 6.4 | 1.65 |
| 21 | Fe—6.5Hf—5.5Pt—7.0C—5.0Ag | 6.4 | 1.9 | 0.5 | 0.5 | 0.5 | 1.7 | 2.8 | 6.5 | 1.45 |
| 22 | Fe—6.5Hf—5.5Pt—7.0C—5.5Ag | 9.8 | 2.8 | 1.0 | 0.6 | 0.6 | 1.7 | 2.8 | 7.0 | 1.3 |
| 23 | Fe—6.5Hf—5.5Pt—7.0C—0.05Au | 10.0 | 2.7 | 1.0 | 0.6 | 0.6 | 1.7 | 2.7 | 6.1 | 1.7 |
| 24 | Fe—6.5Hf—5.5Pt—7.0C—0.1Au | 6.7 | 2.0 | 0.6 | 0.6 | 0.6 | 1.7 | 2.7 | 6.3 | 1.6 |
| 25 | Fe—6.5Hf—5.5Pt—7.0C—5.0Au | 6.5 | 1.9 | 0.6 | 0.6 | 0.6 | 1.8 | 2.8 | 6.5 | 1.5 |
| 26 | Fe—6.5Hf—5.5Pt—7.0C—5.5Au | 10.0 | 2.9 | 1.1 | 0.6 | 0.6 | 1.7 | 2.8 | 7.1 | 1.35 |
| 27 | Fe—6.5Hf—5.5Pt—7.0C—0.05Cd | 10.1 | 2.7 | 1.0 | 0.6 | 0.5 | 1.5 | 2.8 | 6.2 | 1.7 |
| 28 | Fe—6.5Hf—5.5Pt—7.0C—0.1Cd | 6.7 | 2.0 | 0.7 | 0.6 | 0.5 | 1.6 | 2.7 | 6.3 | 1.65 |
| 29 | Fe—6.5Hf—5.5Pt—7.0C—5.0Cd | 6.6 | 1.9 | 0.6 | 0.6 | 0.5 | 1.7 | 2.8 | 6.5 | 1.45 |
| 30 | Fe—6.5Hf—5.5Pt—7.0C—5.5Cd | 9.8 | 2.8 | 1.0 | 0.6 | 0.6 | 1.7 | 2.7 | 7.0 | 1.3 |
| 31 | Fe—6.5Hf—5.5Pt—7.0C—0.02Cu—0.03Ag | 9.8 | 2.8 | 1.1 | 0.6 | 0.6 | 1.7 | 2.7 | 6.2 | 1.7 |
| 32 | Fe—6.5Hf—5.5Pt—7.0C—0.05Cu—0.05Ag | 7.0 | 2.0 | 0.7 | 0.6 | 0.5 | 1.7 | 2.8 | 6.3 | 1.6 |
| 33 | Fe—6.5Hf—5.5Pt—7.0C—2.5Cu—2.5Ag | 6.9 | 2.0 | 0.6 | 0.6 | 0.5 | 1.7 | 2.9 | 6.5 | 1.4 |

TABLE 2-continued

| Sample | | Hc [Oe] at each heat treatment temperature [°C.] | | | | | | | | Bs |
|---|---|---|---|---|---|---|---|---|---|---|
| No. | Composition of alloy film [at %] | 300 | 400 | 450 | 500 | 550 | 600 | 650 | 700 | [T] |
| 34 | Fe—6.5Hf—5.5Pt—7.0C—2.75Cu—2.75Ag | 10.0 | 2.9 | 1.2 | 0.6 | 0.6 | 1.7 | 3.1 | 7.1 | 1.3 |

As can be seen from Table 2, for example, if Ag is added (sample Nos. 19–22), in the case of the 0.05 at. % addition of Ag, the coercive force Hc does not become 1 Oe or less if the alloy thin film is not subjected to heat treatment of 450° C. or more. However, if Ag is added by 0.1–5.0 at. % (sample Nos. 20 and 21), a coercive force of 1 Oe or less can be obtained even with heat treatment of 450° C. the heat treatment temperature necessary for lowering the coercive force Hc becomes lower. If Ag is added by 5.5 at. %, the coercive force does not become 1 Oe or less so far as no heat treatment of 450° C. or more is again performed. From these facts, it is preferable that the optimum content of Ag be selected to be 0.1–5.0 at. %, similarly to the above-described case of Cu.

If Au or Cd is added instead of Cu or Ag (sample Nos. 23–30), it is preferable to add Au or Cd by 0.1–5.0 at. % in order to lower the heat treatment temperature necessary for lowering the coercive force Hc, as in the case of the addition of Cu or Ag. If Ag, Au or Cd in excess of 5.0 at. % is added, the saturation magnetic flux density Bs becomes less than 1.4 T, as in the case of the addition of Cu. Therefore, it is preferable that the content of Ag, Au Or Cd be selected to be 0.1–5.0 at. %.

Sample Nos. 31–34 denote samples in which both Cu and Ag are added. As can be seen from sample Nos. 31–34, if the total content of Cu and Ag is 0.1–5.0 at. %, a coercive force of 1 Oe or less can be obtained even with heat treatment of 450° C.

Experimental Example 2

Figure 2:
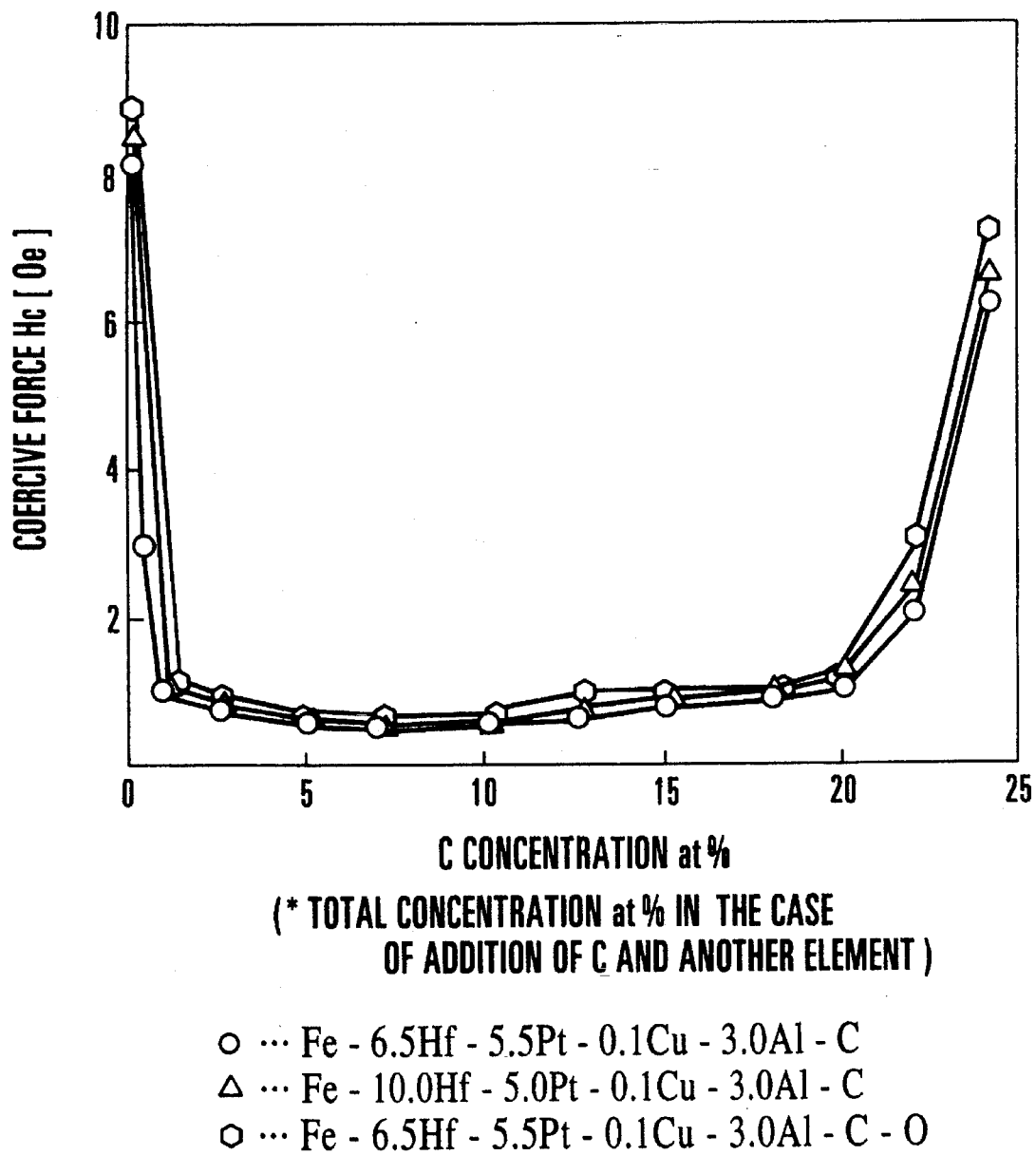
FIG. 2 is a graph showing the variations of coercive force with respect to the amount in which C and O are added to Fe-Hf-Pt-Cu-Al based alloys.

To examine the adequate content of Z (for example, C), C was added to both an Fe-6.5Hf-5.5Pt-0.1Cu-3.0Al (at. %) alloy thin film and an Fe-10.0Hf-5.0Pt-0.1Cu-3.0Al (at. %) alloy thin film, and the dependence of their coercive forces Hc on the respective C contents were examined. Further, both C and O were added to an Fe-6.5Hf-5.5Pt-0.1Cu-3.0Al (at. %) alloy thin film, and the dependence of its coercive force Hc on the C+O content was examined. FIG. 2 shows the results of the examinations. Incidentally, the content of C can be varied by controlling the amount of $CH_4$ gas, while the content of O can be varied by further supplying an $O_2$ gas while controlling the amount thereof. The heat treatment was performed at 550° C. for 30 minutes.

As can be seen from FIG. 2, if C is not added to the Fe-6.5Hf-5.5Pt-0.1Cu-3.0Al (at. %) alloy thin film, the coercive force Hc is approximately 8 Oe. If C is added, the coercive force Hc falls below 1 Oe at approximately 1 at. % and becomes 0.5 Oe at approximately 5–7 at. %. However, if the content of C exceeds 10 at. %, the coercive force Hc starts to rise, and if the content of C exceeds 20 at. %, the coercive force Hc rises sharply. Regarding the Fe-10.0Hf-5.0Pt-0.1Cu3.0Al (at. %) alloy thin film, if C is added by 1 at. % or more, the coercive force Hc falls below 1 Oe, and if the content of C exceeds 10 at. %, the coercive force Hc starts to rise. If the content of C exceeds 20 at. %, the coercive force Hc rises sharply. Accordingly, to prevent the coercive force Hc from exceeding 1 Oe, it is preferable to select the content of C to be 1–20 at. %.

Also, as can be seen from FIG. 2, if both C and O are added to the Fe-6.5Hf-5.5Pt-0.1Cu-3.0Al (at. %) alloy thin film, as far as the total content of C and O is 1–20 at. %, the coercive force Hc does not exceed 1 Oe.

Although not specifically referred to herein, it is also possible to achieve similar effects by adding N and B.

Experimental Example 3

Figure 3:
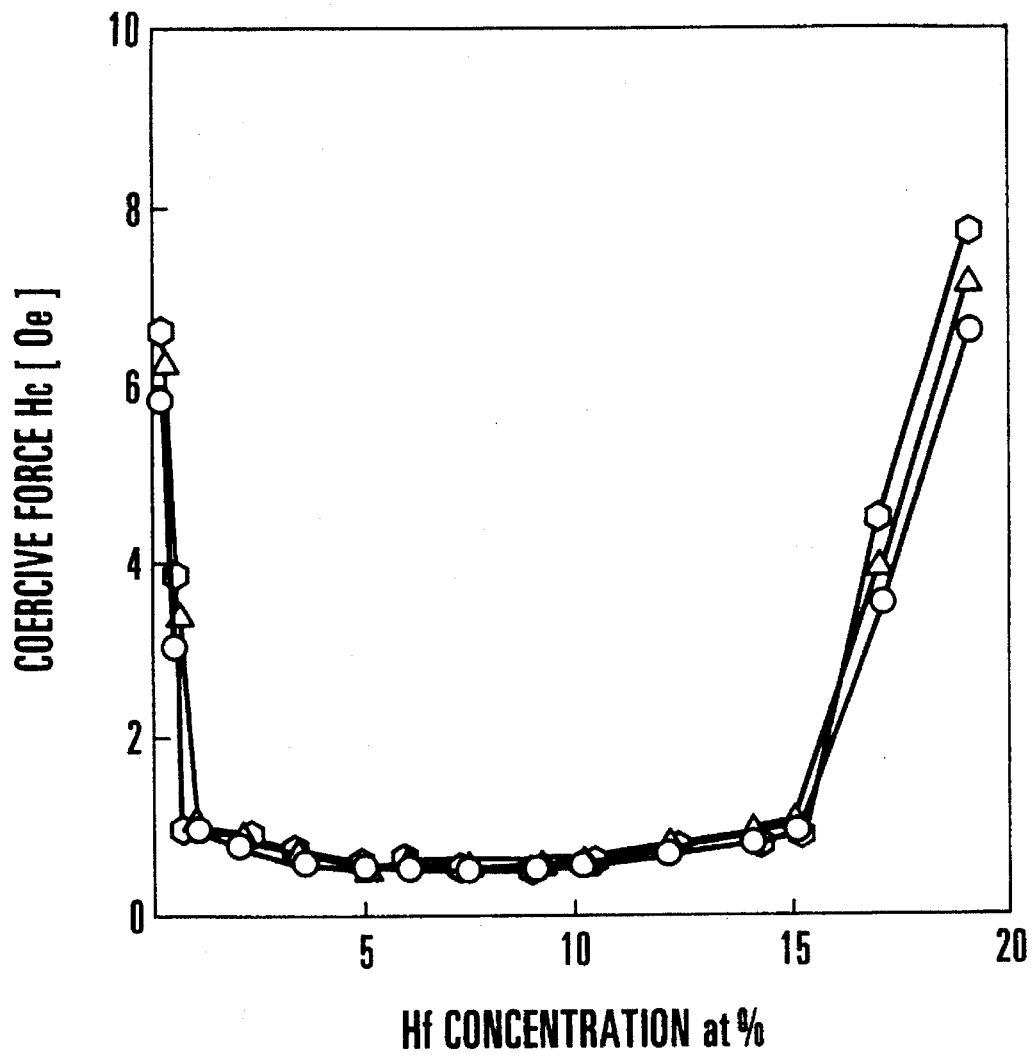
FIG. 3 is a graph showing the variations of coercive force with respect to the amount in which Hf and Zr are added to Fe-Pt-C-Cu-Al based alloys.

To examine the adequate content of M (for example, Hf), Hf was added to both an Fe-5.5Pt-7.0C-0.1Cu-3.0Al (at. %) alloy thin film and an Fe-5.0Pt-3.0C-0.1Cu-3.0Al (at. %) alloy thin film, and the dependence of their coercive forces Hc on the respective Hf contents were examined. Further, both Hf and Zr were added to an Fe-5.5Pt-7.0C-0.1Cu-3.0Al (at. %) alloy thin film, and the dependence of its coercive force. Hc on the Hf+Zr content was examined. FIG. 3 shows the results of the examinations. The heat treatment was performed in a vacuum heat treatment oven at 550° C. for 30 minutes.

As can be seen from FIG. 3, if Hf is not added to the Fe-5.5Pt-7.0C-0.1Cu-3.0Al (at. %) alloy thin film, the coercive force Hc is approximately 6 Oe. If Hf is added, the coercive force Hc falls below 1 Oe at approximately 1 at. % and becomes approximately 0.5 Oe at approximately 5–10 at. %. However, if the content of C exceeds 15 at. %, the coercive force Hc rises sharply.

Regarding the Fe-5.0Pt-3.0C-0.1Cu-3.0Al (at. %) alloy thin film, if Hf is added by 1 at. % or more, the coercive force Hc falls below 1 Oe, and if the content of C exceeds 15 at. %, the coercive force Hc rises sharply. Accordingly, to prevent the coercive force Hc from exceeding 1 Oe, it is preferable to select the content of Hf to be 1–15 at. %.

Also, as can be seen from FIG. 3, if both Hf and Zr are added to the Fe-5.5Pt-7.0C-0.1Cu-3.0Al (at. %) alloy thin film, as far as the total content of Hf and Zr is 1–15 at. %, the coercive force Hc does not exceed 1 Oe.

Although not specifically referred to herein, it is also possible to achieve similar effects by adding Ti, Zr, V, Nb, Ta, Mo and W.

Experimental Example 4

To examine the adequate content of a platinum group element, examinations were performed as to the corrosion resistance obtainable by adding a platinum group element to an Fe-6.5Hf-7.0C-0.1Cu-3.0Al (at. %) alloy, as well as the variations of the saturation magnetic flux density due to the addition of the platinum group element. Table 3 shows the results of the examinations. The corrosion tests were performed with such alloys being respectively dipped in a 1N-HCl solution and a 1N-NaCl solution (both, 10° C.) for one week.

TABLE 3

| Concentration of added platinum metal (at %) | Corrosion test condition 1N—HCl | Corrosion test condition 1N—NaCl | Decision | Saturation magnetic flux density [T] | Concentration of added platinum metal (at %) | Corrosion test condition 1N—HCl | Corrosion test condition 1N—NaCl | Decision | Saturation magnetic flux density [T] |
|---|---|---|---|---|---|---|---|---|---|
| Pt | | | | | Pd | | | | |
| 0 | 150 | 15 | Δ | 1.7 | 0 | 150 | 15 | Δ | 1.7 |
| 0.5 | 100 | 10 | Δ | 1.65 | 0.5 | 110 | 10 | Δ | 1.55 |
| 1 | 4.0 | 3.0 | ○ | 1.61 | 1 | 2.0 | 3.1 | ○ | 1.5 |
| 5 | 0.5 | 0.8 | ⊙ | 1.53 | 5 | 0.6 | 0.9 | ⊙ | 1.45 |
| 8 | 0.4 | 0.75 | ⊙ | 1.47 | 8 | 3.0 | 3.5 | ○ | 1.42 |
| 10 | 1.0 | 1.0 | ○ | 1.42 | 10 | 6 | 8 | ○ | 1.4 |
| 12 | 1.4 | 1.2 | ○ | 1.35 | 12 | 85 | 15 | Δ | 1.3 |
| 14 | 2.0 | 3.0 | ○ | 1.29 | 14 | 120 | 20 | Δ | 1.25 |
| Ru | | | | | Rh | | | | |
| 0 | 150 | 15 | Δ | 1.7 | 0 | 150 | 15 | Δ | 1.7 |
| 0.5 | 110 | 10 | Δ | 1.6 | 0.5 | 100 | 12 | Δ | 1.52 |
| 1 | 0.3 | 0.5 | ⊙ | 1.55 | 1 | 9 | 7 | ○ | 1.5 |
| 5 | 0.4 | 0.6 | ⊙ | 1.5 | 5 | 8 | 8 | ○ | 1.45 |
| 8 | 1.0 | 1.0 | ○ | 1.42 | 8 | 8.5 | 7 | ○ | 1.42 |
| 10 | 1.4 | 1.1 | ○ | 1.4 | 10 | 9 | 8 | ○ | 1.4 |
| 12 | 90 | 20 | Δ | 1.33 | 12 | 91 | 20 | Δ | 1.3 |
| 14 | 160 | 30 | Δ | 1.2 | 14 | 110 | 30 | Δ | 1.29 |

*Unit: mg/cm²/year

Referring to the case of the addition of Pt as a representative example in Table 3, if the content of Pt is 0.5 at. %, it cannot be said that the corrosion resistance is evidently improved. However, if the content of Pt becomes 1 at. % or more, the corrosion resistance improves, and as the content of Pt increases, the corrosion resistance improves more and more. However, if the content of Pt exceeds 10 at. %, the saturation magnetic flux density falls below 1.4 [T] and the corrosion resistance degrades little by little. Accordingly, from the viewpoints of corrosion resistance and magnetic characteristic, it is preferable that the content of Pt be selected to be 1–10 at. %. It has also been discovered that the contents of the other platinum groups shown in Table 3 are preferably 1–10 at. % each, similarly to the content of Pt.

As can be seen from each of the above-described experimental examples, if the contents of individual elements in a magnetic thin film made of a magnetic alloy represented as Fe-M-X-L-Al-Z are selected to be M (for example, Hf) 1–15 at. %; X (platinum groups) 1–10 at. %; L (for example, Cu) 0.1–5 at. %; Al 3–10 at. %; and Z (for example, C) 1–20 at. %, it is possible to realize good magnetic characteristics, such as low coercive force and high saturation magnetic flux density, over a wide range of heat treatment temperatures. Further, the corrosion resistance is improved.

As is apparent from the above description, according to the aforesaid embodiment, there is provided a magnetic thin film made of an alloy which contains Fe, at least one kind of element selected from the group consisting of Ti, Zr, Hf, V, Nb, Ta, Mo and W, at least one kind of element selected from among platinum group elements, at least one kind of element selected from the group consisting of Cu Ag, Au and Cd, at least one kind of element selected from the group consisting of C, O, B and N, and Al. In this magnetic thin film, at least one kind of element selected from the group consisting of Ti, Zr, Hf, V, Nb, Ta, Mo and W is added by 1–15 at. %, at least one kind of element selected from among platinum group elements is added by 1–10 at. %, at least one kind of element selected from the group consisting of Cu, Ag, Au and Cd is added by 0.1–5 at. %, at least one kind of element selected from the group consisting of C, O, B and N is added by 1–20 at. %, and Al is added by 3–10 at. %. Accordingly, the heat treatment temperature necessary for improving magnetic characteristics can be reduced, and heat resistance is also improved. The magnetic characteristics are improved over a wide range of heat treatment temperatures and, in addition superior corrosion resistance can be achieved. Particularly, by using the thin film as a material for a magnetic head, it is possible to provide a magnetic head capable of high density magnetic recording.

SECOND EMBODIMENT

The second embodiment which will be described below relates to a composition in which Al is omitted from the composition of the magnetic thin film referred to above in the description of the first embodiment and only Pt is added as a platinum group element. The composition according to the second embodiment is represented as Fe-M-Pt-Z, and the adequate contents of M and Z were examined by experiment. The results of the respective examinations will be described below with reference to Experimental Examples 5 and 6.

The experiments were performed using the sputtering apparatus shown in FIG. 1 in a manner similar to that explained previously in connection with the first embodiment. The pair of targets were each formed using an Fe-M-Pt based material containing no C.

A hydrocarbon gas $CH_4$ together with an Ar gas was introduced into the vacuum chamber 2 via the mass flow rate meter 5, and film formation was performed by sputtering in an atmosphere composed of the gas mixture.

Incidentally, since a C-containing magnetic thin film is unstable because it contains a considerable number of amorphous phases, crystallites were deposited through a further heat treatment of 400°–700° C.

Experimental Example 5

Experiments were performed on magnetic thin films made of an Fe-M-Pt-C based alloy in which C was added as the element Z. First of all, reference will be made to the reason why elements of limited conditions were employed as the constituent elements of the magnetic thin films prepared as this experimental example.

If Pt is added to Fe, the corrosion resistance can be improved even if the content of Pt is 1 at. % (atomic percent) or more. However, if the content of Pt does not exceed 5 at. %, it is impossible to realize satisfactory corrosion resistance and abrasion resistance. If the content of Pt exceeds 10 at. %, the magnetic characteristics are degraded and the saturation magnetic flux density is lowered. For these reasons, the content of Pt was determined as 5-10 at. %. Particularly in the range of 5-7 at. %, values greater than or equal to 1.5 T were attained as the saturation magnetic flux density Bs.

The element M is an element necessary for improving soft magnetic characteristics, and in this experimental example, a transition element which exhibits a high affinity to C in a carbonized state was selected as the element M. Ti, Zr, Hf, V, Nb, Ta, Mo and W, in particular, have the nature of readily becoming amorphous immediately after sputtering, and readily forming crystallites during the process of combining with C and forming a carbide through heat treatment following sputtering. The formation of such crystallites improves the magnetic characteristics of the magnetic thin film. If the element M is added by 2 at. % or more, crystallites are formed, but if the content of the element M exceeds 15 at. %, the saturation magnetic flux density lowers, and the thin film becomes excessively brittle and the abrasion resistance lowers. Accordingly, the content of M is selected to be 2-15 at. %, more preferably, 3-8 at. %.

The element C is an element effective in improving soft magnetic characteristics. If the element C is not added by 0.5 at. % or more, no formation of crystallites can be effectively promoted. If the content of the element C exceeds 15 at. %, the saturation magnetic flux density lowers. As the C content increases, amorphous phases are more readily formed, and the generation of crystallites can be readily controlled by changing the conditions of subsequent heat treatment. For this reason, the C content needs to be approximately 10 at. % or more. However, since Pt is added, amorphous phases are readily formed, and if Pt is added by 6 at. %, the amorphous phases are more readily formed until the C content becomes approximately 7 at. %. Accordingly, the content of C is selected to be 0.5-15 at. %, more preferably, 7-12 at. %.

Then, reference will be made to the results of the measurements and tests performed on the characteristics of the magnetic thin films prepared as this experimental example.

Figure 4:
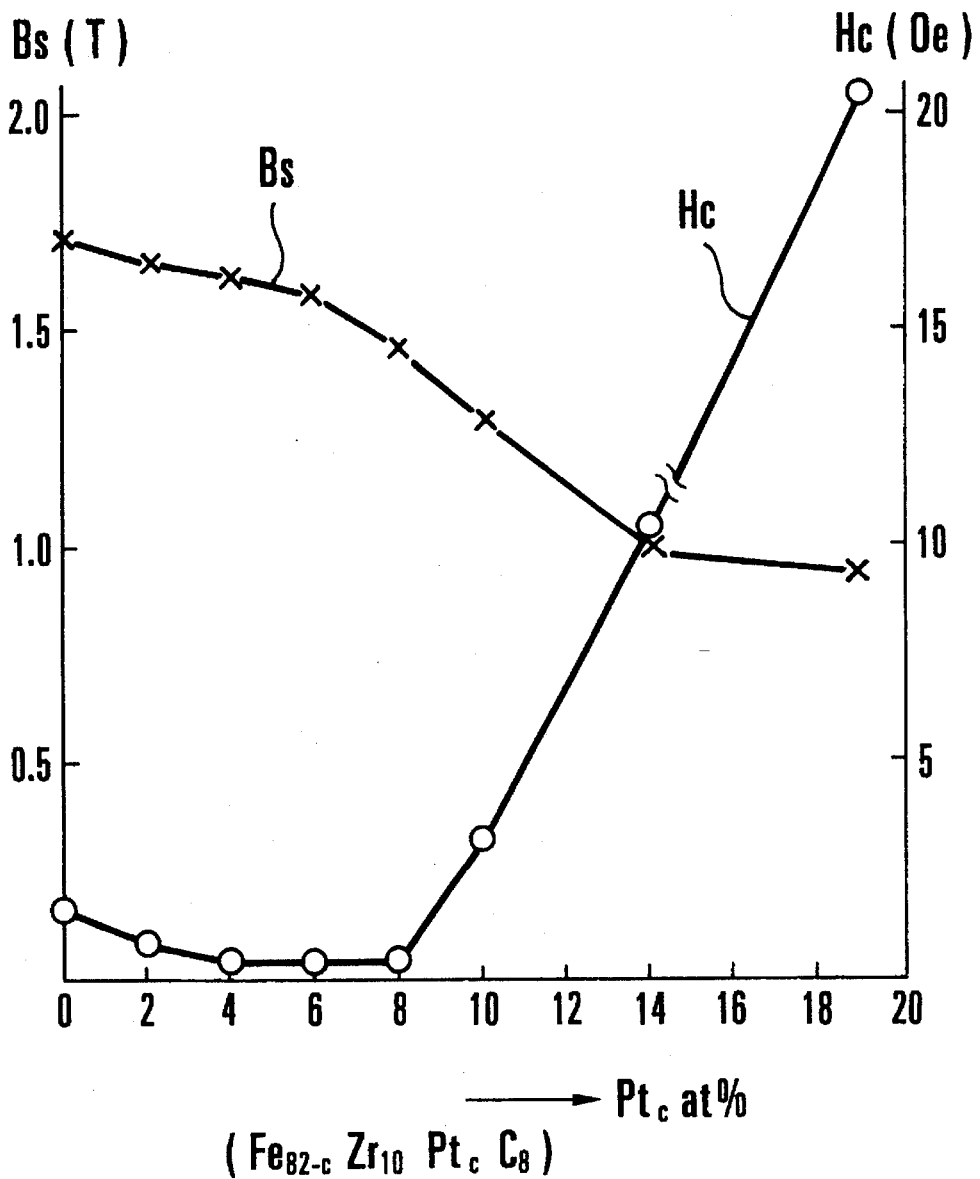
FIG. 4 is a graph showing the variations of saturation magnetic flux density and coercive force with respect to the variations of the contents of Pt and Fe in the composition of a magnetic thin film represented as $Fe_{82-c}Zr_{10}Pt_cC_8$.

The graph of FIG. 4 shows the variations of the saturation magnetic flux density Bs and the coercive force Hc with respect to the variations of the contents of Pt and Fe in the composition of a magnetic thin film represented as $Fe_{82-c}Zr_{10}Pt_cC_8$. As shown in FIG. 4, under the above-described composition conditions, if the Pt content is between 4 at. % and 8 at. %, it is possible to attain the condition that the saturation magnetic flux density Bs is not less than 1.4 T and the coercive force Hc is not greater than 10 Oe.

Table 4 shows the compositions of individual magnetic thin samples prepared as this experimental example and comparative examples, and their saturation magnetic flux densities, coercive forces and corrosion resistances as well as the results of measurements and tests of their abrasion resistances. The values of the corrosion resistance in Table 4 indicate the corrosion rates of the respective samples which were dipped in both a 10° C. hydrochloric acid having a concentration of 1N and a NaCl solution having a concentration of 1N. The values of the abrasion resistance are represented as the step difference with a single-crystal (100) plane of the aforesaid ferrite, and indicate the amounts of abrasion of the respective samples which were measured after a dummy head for abrasion test was moved in sliding contact with magnetic tape at a relative speed of 10 m/s for 1,000 hours, the dummy head being prepared by forming each of the magnetic thin film samples 5 μm in thickness on a dummy core made of Mn-Zn ferrite. In Table 4, sample Nos. 2–6 are included in the category of the present experimental example, and the other samples denote the comparative examples. Incidentally, the analysis of the compositions of the respective samples was performed with an X-ray microanalyzer (EPMA) and an inductively coupled plasma emission spectrometry (ICP emission spectrometry).

TABLE 4

| Sample No. | Composition (at %) | Saturation magnetic flux density Bs (T) | Coercive force Hc (Oe) | Corrosion resistance (mg/cm²/year) HCl 1N | Corrosion resistance (mg/cm²/year) NaCl 1N | Abrasion resistance (Step difference Å) with ferrite |
|---|---|---|---|---|---|---|
| 1 | $Fe_{94}$—$Pt_6$ | 2.00 | 20 > | 10 | 5 | 45 |
| 2 | $Fe_{80}$—$W_6$—$Pt_6$—$C_8$ | 1.72 | 1.0 | 0.5 | 0 | 0 |
| 3 | $Fe_{75}$—$V_{10}$—$Pt_5$—$C_{10}$ | 1.58 | 2.0 | 0.8 | 0.5 | 4 |
| 4 | $Fe_{76}$—$Ta_{10}$—$Pt_6$—$C_8$ | 1.55 | 0.5 | 0.5 | 0 | 3 |
| 5 | $Fe_{75}$—$Zr_{10}$—$Pt_5$—$C_{10}$ | 1.60 | 3.0 | 2.0 | 1.2 | 5 |
| 6 | $Fe_{74}$—$Zr_{10}$—$Pt_8$—$C_8$ | 1.43 | 5.3 | 0.5 | 0 | 4 |
| 7 | General Sendust Fe—Al—Si | 1.10 | 0.1 | 200 | 20 | 100 |
| 8 | General Amorphous Co—Nb—Zr | 1.00 | 0.1 | 10 | 0 | 85 |
| 9 | $Fe_{80}$—$Zr_8$—$C_{12}$ | 1.60 | 0.2 | 220 | 30 | 75 |
| 10 | $Fe_{78}$—$Zr_8$—$Pt_2$—$C_{12}$ | 1.54 | 1.2 | 150 | 25 | 76 |

As can be seen from Table 4, according to this experimental example, it is possible to remarkably enhance corrosion resistance and abrasion resistance without degrading magnetic characteristics, such as the saturation magnetic flux density Bs and the coercive force Hc. Further, a magnetic thin film according to this experimental example is not degraded in magnetic characteristic under various environmental conditions. By using such a thin film as a material for a magnetic head, it is possible to provide a magnetic head capable of high density magnetic recording.

Experimental Example 6

In this experimental example, magnetic thin films were formed using an Fe-X-Pt-O based alloy, an Fe-X-Pt-N based alloy, an Fe-X-Pt-B based alloy, an Fe-X-Pt-C-O based alloy to which two kinds of nonmetallic elements were added, and an Fe-X-Pt-B-C based alloy.

Regarding the Fe-X-Pt-O based alloy, film formation was carried out by performing reactive sputtering of an Fe-X-Pt based target which contains no $O_2$, in an atmosphere composed of a mixture of an Ar gas and an $O_2$ gas.

Regarding the Fe-X-Pt-N based alloy, film formation was carried out by performing reactive sputtering of an Fe-X-Pt based target which contains no N, in an atmosphere composed of a mixture of an Ar gas and an $N_2$ gas.

Either of the Fe-X-Pt-O based alloy thin film and the Fe-X-Pt-N based alloy thin film exhibited good magnetic characteristics at a composition ratio equivalent to that of the Fe-X-Pt-C based alloy thin film of Experimental Example 5, preferably on the condition that the content of the element X was 3–8 at. % and the respective contents of O and N were 7–12 at. %.

Regarding the Fe-X-Pt-B based alloy, film formation was carried out by performing sputtering of an Fe-X-Pt-B based target in a pure Ar atmosphere. Since the state of the composition immediately after sputtering is unstable because of the presence of amorphous phases, crystallites were deposited by performing a further heat treatment of 400°–700° C., so that the thermal stability and magnetic characteristics were improved.

Similarly to the case of Experimental Example 5, tests were performed on the magnetic characteristics, corrosion resistance and abrasion resistance of each of the aforesaid experimental examples. Table 5 shows the results of the tests.

As is apparent from the above description, according to the second embodiment, there is provided a magnetic thin film made of a magnetic material which contains Fe as an essential element and, as additive elements, 5–10 atomic %, Pt; 2–15 atomic %, at least one kind of transition element selected from the group consisting of Ti, Zr, Hf, V, Nb, Ta, Mo and W; and 0.5–15 atomic %, at least one kind of nonmetal selected from the group consisting of C, O, B and N. Accordingly, it is possible to provide magnetic thin films having high saturation magnetic flux density, low coercive force, and remarkably improved corrosion resistance and abrasion resistance similarly to the magnetic thin films according to the first embodiment. Further, the magnetic thin films according to the second embodiment are not degraded in magnetic characteristic under various environmental conditions, and by using such a thin film as a material for a magnetic head, it is possible to provide a magnetic head capable of high density magnetic recording.

Figure 5:
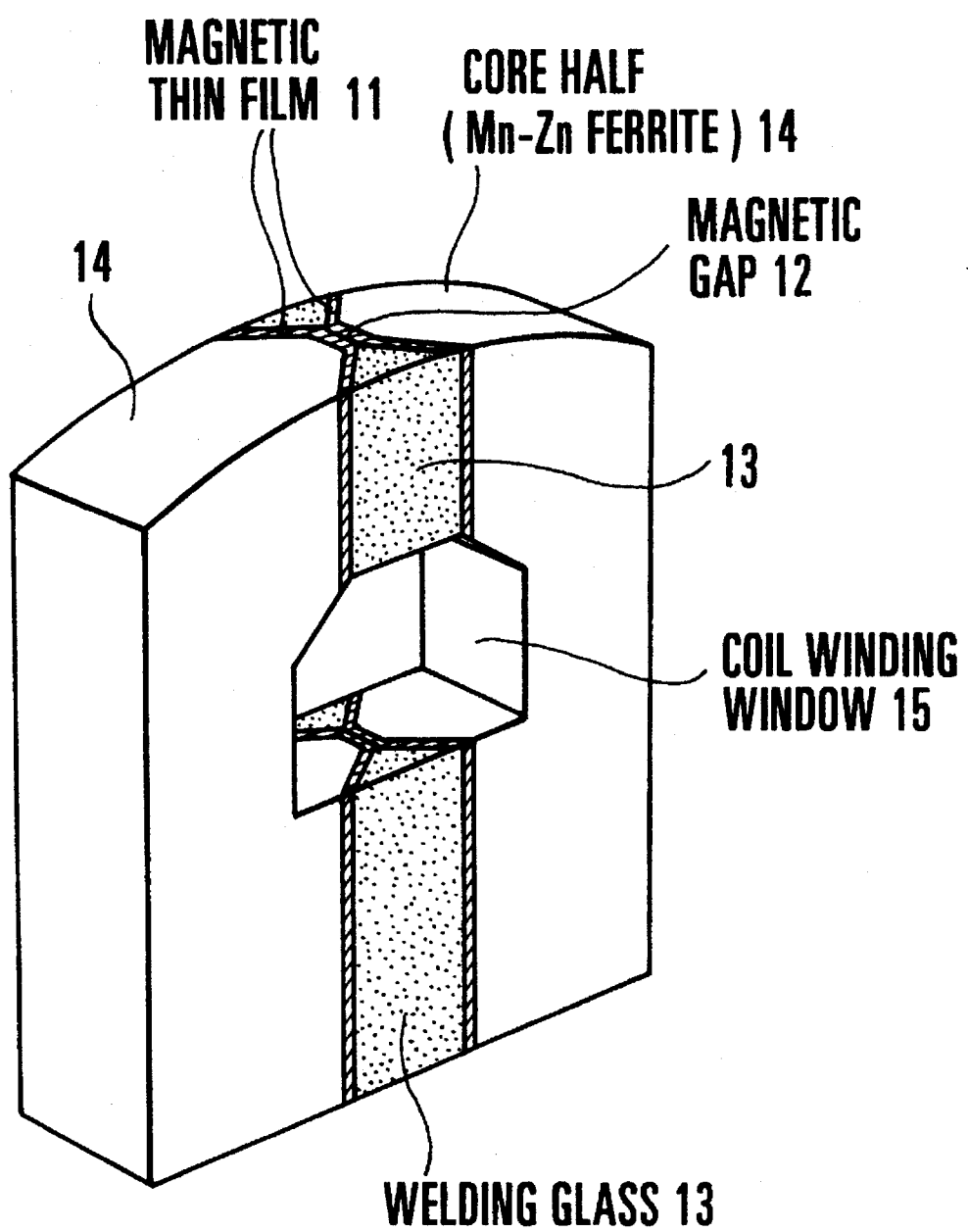
FIG. 5 is a schematic, perspective view of an MIG type magnetic head which uses a magnetic thin film according to each embodiment of the present invention.

FIG. 5 is a diagrammatic perspective view showing the magnetic core of an MIG head which is produced using one kind of magnetic thin film having any one of the compositions determined according to each of the aforesaid embodiments. The arrangement shown in FIG. 5 includes magnetic thin films 11 according to each of the aforesaid embodiments, a magnetic gap 12 formed by $SiO_2$ and $Cr_2O_3$, a welding glass 13 for welding core halves together, core halves 14 made of single-crystal Mn-Zn ferrite, and a coil winding window 15. The two core halves 14 are made to butt on each other across the magnetic gap 12, and are welded together by the welding glass 13. The magnetic thin films 11 are formed on the butt faces of the respective core halves 14. Then, a coil winding (not shown) is wound around this magnetic core through the coil winding window 15, thus preparing a magnetic head.

What is claimed is:

1. A magnetic alloy expressed as a composition formula of Fea-Mb-Xc-Ld-Ale-Zf, where a, b, c, d, e, and f represent atomic %; M is at least one element selected from the group

TABLE 5

| Sample No. | Composition (at %) | Saturation magnetic flux density Bs (T) | Coercive force Hc (Oe) | Corrosion resistance (mg/cm²/year) | | Abrasion resistance (Step difference Å) with ferrite |
|---|---|---|---|---|---|---|
| | | | | HCl 1N | NaCl 1N | |
| 11 | $Fe_{76}$—$Zr_{10}$—$Pt_6$—$C_8$ | 1.58 | 2.8 | 1.8 | 0.2 | 3 |
| 12 | $Fe_{76}$—$Zr_{10}$—$Pt_6$—$N_8$ | 1.61 | 1.8 | 2.0 | 0.3 | 5 |
| 13 | $Fe_{76}$—$Zr_{10}$—$Pt_6$—$B_8$ | 1.50 | 2.1 | 1.7 | 0.2 | 10 |
| 14 | $Fe_{76}$—$Zr_{10}$—$Pt_6$—$C_6$—$O_2$ | 1.57 | 2.7 | 1.8 | 0.2 | 3 |
| 15 | $Fe_{76}$—$Zr_{10}$—$Pt_6$—$B_4$—$C_4$ | 1.60 | 1.0 | 1.0 | 0.3 | 3 |

As can be seen from the samples shown in Table 5, according to this experimental example, similarly to the Experimental Example 5, it is possible to provide a magnetic thin film of remarkably improved corrosion resistance and abrasion resistance without degrading the magnetic characteristics, such as the saturation magnetic flux density Bs and the coercive force Hc.

consisting of Ti, Zr, Hf, V, Nb, Ta, Mo and W; X is at least one element selected from among platinum group elements; L is at least one element selected from the group consisting of Cu, Ag, Au and Cd; and Z is a combination C and O, the respective values of a, b, c, d, e and f being selected to meet the following conditions:

a+b+c+d+e+f=100

1≦b≦15

1≦c≦10

$0.1 \leq d \leq 5$ $3 \leq e \leq 10$ $1 \leq f \leq 20$.

2. A magnetic alloy according to claim 1, wherein in the composition formula, M is Hf; X is Pt; and L is Cu.

3. A magnetic alloy according to claim 1, wherein in the composition formula, M is Hf and Zr; X is Pt; and L is Cu.

4. A magnetic alloy expressed as a composition formula of Fea-Mb-Ptc-Zd, where a, b, c, and d represent atomic %; M is at least one element selected from the group consisting of Ti, Zr, Hf, V, Nb, Ta, Mo and W; and Z is a combination of C and O, the respective values of a, b, c and d being selected to meet the following conditions:

$2 \leq b \leq 15$ $5 \leq c \leq 10$ $0.5 \leq d \leq 15$ $a+b+c+d=100$.

5. A magnetic alloy according to claim 4, wherein in the composition formula, M is Zr.

* * * * *

UNITED STATES PATENT AND TRADEMARK OFFICE
CERTIFICATE OF CORRECTION

PATENT NO. : 5,478,416
DATED : December 26, 1995
INVENTOR(S) : Satoshi Takaoka, et al.

It is certified that error appears in the above-identified patent and that said Letters Patent is hereby corrected as shown below:

On the Cover Page, insert the following:

[30] Foreign Application Data
January 29, 1993 [JP]  Japan ..... 5-013490
January 29, 1993 [JP]  Japan ..... 5-013489

Col. 2, line 1, after "in" delete the comma.

Col. 5, line 12, change "less," to -- less. --.

Col. 5, line 29, change "Can" to -- can --.

Col. 10, line 34, after "addition" insert -- , --.

Signed and Sealed this

Twenty-seventh Day of August, 1996

Attest:

BRUCE LEHMAN

*Attesting Officer*   *Commissioner of Patents and Trademarks*